Figure 1:
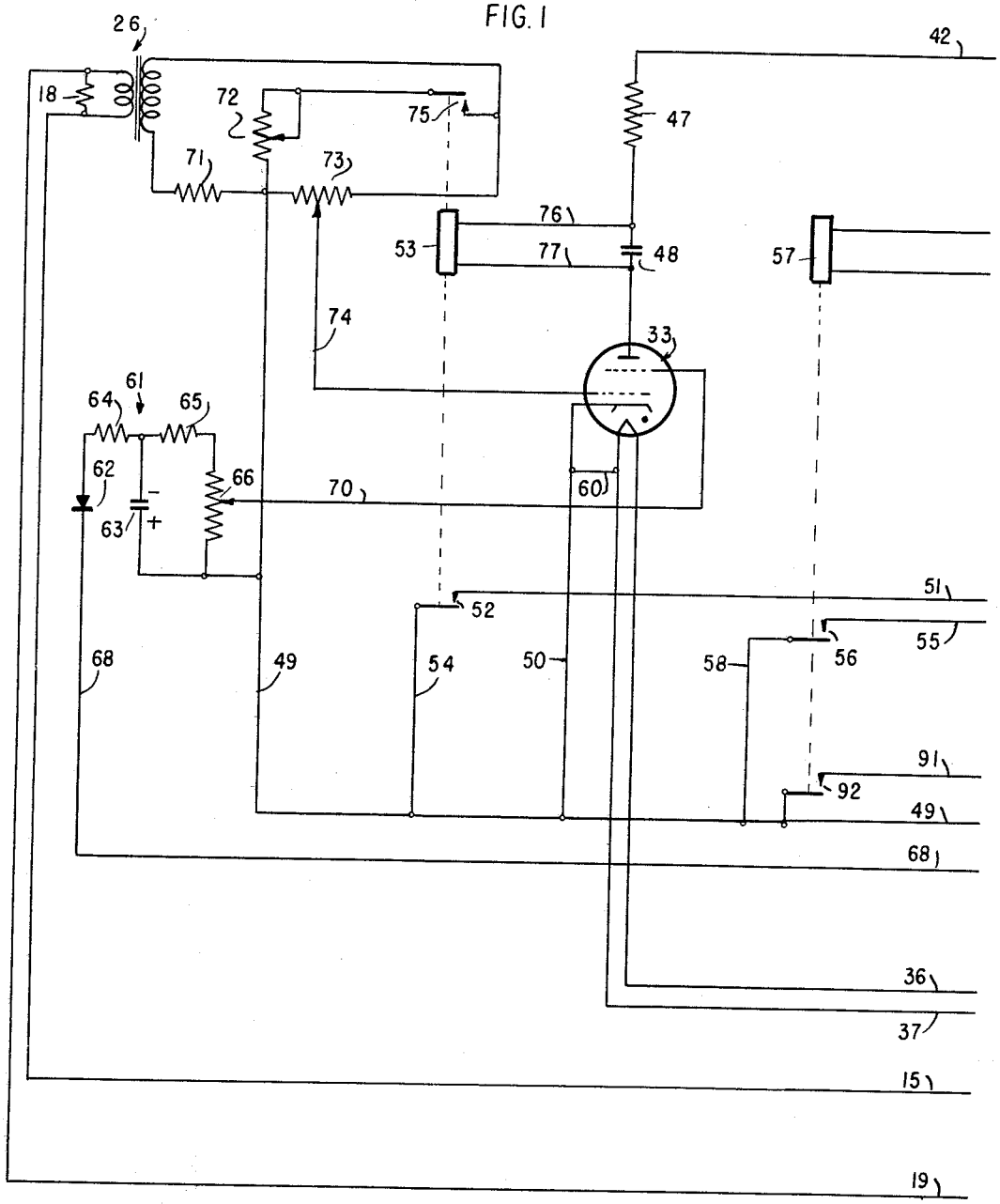

Sept. 20, 1955  D. F. PECK  2,718,631
ELECTRICAL SIGNAL SYSTEM FOR MOTOR PROTECTION
Filed Feb. 24, 1954  2 Sheets-Sheet 1

INVENTOR.
DUANE F. PECK

ATTY.

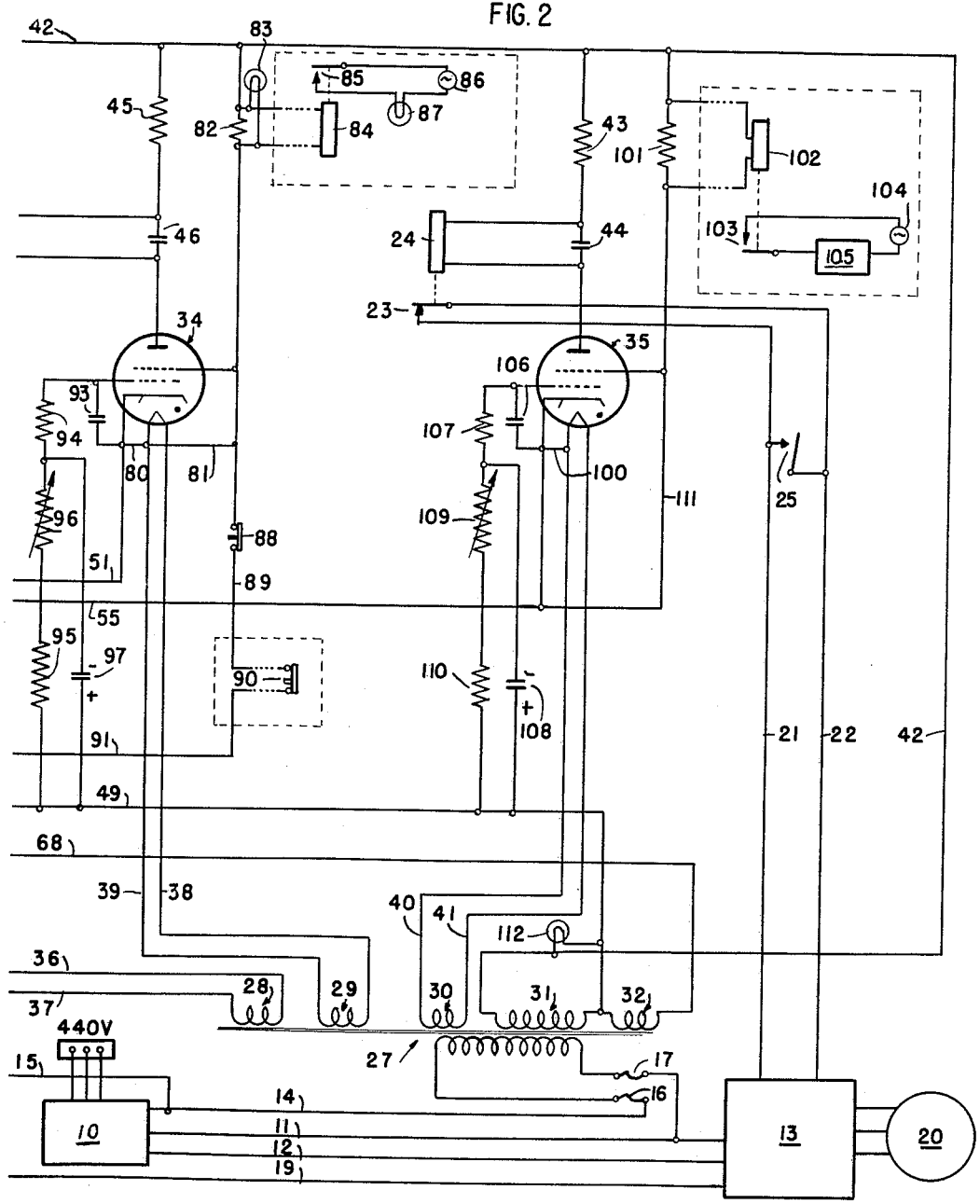

United States Patent Office 2,718,631
Patented Sept. 20, 1955

2,718,631

ELECTRICAL SIGNAL SYSTEM FOR MOTOR PROTECTION

Duane F. Peck, Clarendon Hills, Ill., assignor to International Harvester Company, a corporation of New Jersey Application February 24, 1954, Serial No. 412,193

6 Claims. (Cl. 340—253)

This invention relates generally to electrical motor protectors, and more specifically to an improved device for electrical motors and machine tools which will automatically operate to protect the electrical motors and machine tools from injury due to overload.

A number of problems have arisen in the art concerning machine tools which are operated by electrical motors and manually controlled by an operator. If, through some negligence of the operator or defect in the machine tool or work-piece, the machine tool is caused to operate beyond its rated capacity, the machine tool may be seriously damaged, the electrical motor operating the machine tool may become seriously overloaded, or the work-piece may be seriously damaged. Because of the relatively high cost of electric motors used to operate machine tools, and the cost of the machine tools themselves, a need has arisen in the art for a protective device which will signal the operator in some way of the approach of an overload point, which will also signal the operator when the equipment is overloaded, and which will, after a certain period of time has elapsed, cause the electrical motor operating the machine to be stopped. It is important that a certain period of time elapse, before the electrical motor operating the machine tool is stopped after the overload point is reached, in order to permit the operator of the machine to disengage the cutting tool, since in many instances there is a serious danger of damage to the machine tool as well as the work-piece if the electrical motor is stopped before the machine tool is disengaged from the work-piece.

Further, it is also important that the operator of a machine tool be signaled when an overload point is approached, since in most instances the operator may by an adjustment of the feed of the machine tool, or some other adjustment, prevent the overload point from being reached. Therefore, it is the object of this invention to provide a protector device which will fulfill the above-noted needs.

It is another object of this invention to provide an overload protector device, for a machine tool operated by an electrical motor, which will be sensitive to the electrical input to the motor.

It is a feature of the present invention that a flashing light is provided to indicate the approach of an overload condition, and a continuously burning light and an audible signal is provided to indicate an overloaded condition.

Other objects and features of the present invention will be apparent upon a perusal of the following specification and drawings of which:

Figures 1 and 2 when faced side-by-side form a complete diagrammatic view of the present embodiment of the invention.

The present embodiment is the preferred embodiment but it is to be understood that changes can be made in the present embodiment by one skilled in the art without departing from the spirit and scope of this invention.

Generally this invention comprises a number of circuits cooperating with a shunt about the input to the electric motor for the machine tool, and further cooperating with a number of signal elements operating responsive to the operation of the circuits to first indicate the approach of an overload condition, secondly to indicate an overload condition, and thirdly to break the input circuit of the electrical motor.

For a detailed description of the present invention reference is made to the drawings. 440 volts three-phase power is supplied by three conductors to the switch 10. The switch 10 may be of any type well known in the art. Conductors 11 and 12 are connected between the switch 10 and the magnetic starter 13. Conductor 14, from the switch 10, is connected to conductor 15 and fuse 16. Fuse 17 is connected to conductor 11. Conductor 15 is connected to a resistor 18, and the other side of the resistor 18 is connected by conductor 19 to the magnetic starter 13. The magnetic starter 13 may be of any suitable type well known in the art, and generally may be said to comprise circuits which will operate to extend the conductors 11, 12, and 19 to the motor 20. Magnetic starter 13 further includes a holding circuit in in which conductors 21 and 22 are connected in series. Normally closed contacts 23 of relay 24 are connected across conductors 21 and 22 to normally maintain the holding circuit for the magnetic starter complete. A switch 25 is also connected across the conductors 21 and 22 so that the holding circuit for the magnetic starter 23 may be manually completely by the operation of switch 25 whenever contacts 23 of relay 24 are open. The holding circuit of the magnetic starter 13 functions to maintain the conductors 11, 12, and 19 connected to the motor 20 when the holding circuit is completed. Thus, the motor 20 is disconnected from conductors 11, 12, and 19 whenever the holding circuit of the magnetic starter 13 is opened.

From the foregoing it can be seen that as the motor 20 operates, a portion of the current drawn thereby will pass through the resistor 18, whereby the resistor 18 will have a varying voltage thereacross dependent upon the varying input current drawn by the motor 20. The primary of the transformer 26 is connected in shunt with resistor 18. The transformer 26 is a step-up transformer, and the secondary of the transformer 26 is connected to a resistor network which will be described below. However, it can be noted here that the voltage drop across the resistor 18 will be stepped up by the transformer 26 and applied to the noted resistor network.

The fuses 16 and 17 are also connected to the primary of a multiple-winding transformer 27. The transformer 27 comprises five secondaries 28, 29, 30, 31 and 32. Secondaries 28, 29, and 30 provide filament voltage for three thyratron tube stages. The three thyratron tube stages include thyratron tubes 33, 34, and 35, and these thyratron tubes may be of any suitable type well known in the art. It has been found that type 2050 thyratrons will operate successfully in the present invention. Secondary 28 is connected by conductors 36 and 37 to the filament of thyratron tube 33. Secondary 29 is connected by conductors 38 and 39 to the filament of thyratron tube 34. Secondary 30 is connected by conductors 40 and 41 to the filament of thyratron tube 35. Each of the thyratron tubes 33, 34, and 35 further comprises a control grid, a shield grid, a cathode, and a plate or anode. The plate or anode voltage for each of the thyratrons 33, 34, and 35 is obtained from the secondary 31. The voltage developed across the secondary 31 is connected by conductor 42 to the plate of thyratron 35 through a resistor 43 and the coil of relay 24. The plate voltage is applied to the plate of thyratron 34 through conductor 42, resistor 45, and the coil of relay 57. The plate voltage is applied to thyratron 33, through conductor 42, resistor 47, and the coil of relay 53. The other side of the secondary 31 is connected to a conductor 49 and to one side of the secondary 32. The cathode of thyratron 33 is connected to conductor 49 through conductor 50. The cathode of thyratron 34 is connected to conductor 49 through conductor 51, the normally open contacts 52 of relay 53 and conductor 54. The cathode of thyratron 35 is connected to conductor 49 through conductor 55, the normally open contacts 56 of relay 57, and conductor 58. Since the voltage applied across the thyratrons is an alternating current, it can be seen that the thyratrons 33, 34, and 35 will only fire or conduct on the positive halves of the cycle when the plates are positive with respect to the cathodes. The noted relays and relay 24 may be of any suitable type well known in the art. A green lamp 112 is provided across secondary 31 to indicate the proper functioning of transformer 27.

Turning next to a detailed description of each thyratron stage, and firstly to a detailed description of the thyratron 33 stage, the cathode of the thyratron 33 is connected to one side of the filament by a jumper 60. Thyratron 33 is biased to be normally non-conducting by a network 61 connected to the shield grid thereof. The network comprises a selenium rectifier 62, a condenser 63, two resistors 64 and 65, and a potentiometer 66. The condenser 63, the resistor 64, and the rectifier 62 are connected in series across conductors 49 and 68. Conductor 68 is connected to one side of the secondary 32. Conductor 49 as previously described is connected to the other side of the secondary 32. The voltage developed by the secondary 32 will be partially rectified by the rectifier 62 to charge the condenser 63. When the condenser 63 is charged, it will be poled as shown in Figure 1. The potentiometer 66 and the resistor 65 are connected in series across the condenser 63 so that as condenser 63 discharges through these elements a negative biasing potential will be developed across the potentiometer 66. The adjustable arm of the potentiometer 66 is connected by conductor 70 to the shield grid of the thyratron 33, and by an adjustment of the movable arm of the potentiometer 66, the thyratron 33 is biased to be normally non-conducting. The control grid of the thyratron 33 is connected to a resistor network which was described previously as connected to the secondary of the transformer 26. This resistor network comprises a resistor 71 and two potentiometers 72 and 73. The potentiometer 73 and the resistor 71 are connected in series across the secondary of the transformer 26. The junction of the resistor 71 and the potentiometer 73 is connected to conductor 49. The movable arm of the potentiometer 73 is connected to the control grid of the thyratron 33 by the conductor 74. The movable arm of the potentiometer 72 is jumpered to one side of the potentiometer 72. Potentiometer 72, connected in series with the normally open contacts 75 of the relay 53, is connected in parallel with potentiometer 73. When relay 53 is de-energized, voltage developed by the secondary of the transformer 26 will be impressed across resistor 71 and potentiometer 73, and a portion of this voltage is applied between the control grid and the cathode of the thyratron 33 through conductors 49 and 74.

The amount of this voltage can be varied by an adjustment of the movable arm of the potentiometer 73. When relay 53 is energized, contacts 75 are closed to bridge potentiometer 73 with potentiometer 72. This will reduce the voltage applied between the control grid and cathode of the thyratron 33 to a degree dependent upon the adjustment of the potentiometer 72 relative to the adjustment of the potentiometer 73. The relative adjustments of the various potentiometers of the thyratron 33 stage will be described below. The coil of relay 53 is connected in the anode or plate circuit of thyratron 33. Condensers 48, 46, and 44 are shunted across relay coils 53, 57, and 24 respectively to reduce the tendency of these relays to chatter because of the half cycle current pulses.

Turning next to a detailed description of the thyratron 34 stage, the cathode and the shield grid are connected to one side of the filament by jumpers 80 and 81 respectively. The shield grid of the thyratron 34 is also connected to the plate voltage on conductor 42 through a resistor 82. A red light 83 is connected across the resistor 82. A relay 84 is also connected across resistor 82. Since it is intended that the structure comprising this invention be mounted substantially at or near the electric motor 20 and the machine tool operated by the motor 20, the relay 84 is mounted at some remote position, such as some supervisory position or desk. The normally open contacts 85 of the relay 84 are connected in series with a power source 86 and another red lamp 87, also disposed at the remote or supervisory position. The shield grid of the thyratron 34 is further connected to one side of a push-button switch 88. The other side of the push-button switch 88 is connected by means of conductor 89 to one side of a second push-button switch 90 located at the remote or supervisory position. The other side of the push-button switch 90 is connected to conductor 49 through conductor 91 and the normally open contacts 92 of the relay 57. The control grid of the thyratron 34 is connected to the cathode thereof through a condenser 93. The control grid of the thyratron 34 is also connected to a biasing network comprising two resistors 94 and 95, a rheostat 96, and a condenser 97. One side of the resistor 95 is connected to conductor 49, and the other side of the resistor 95 is connected to one side of the rheostat 96. The other side of the rheostat 96 is connected to one side of the resistor 94, and the other side of resistor 94 is connected to the control grid of the thyratron 34. The condenser 97 is connected between resistor 94 and the rheostat 96 and to conductor 49. When condenser 97 is fully charged, and poled as shown in Figure 2, the thyratron 34 is biased to the point of non-conduction. Condenser 97 is charged on the half cycles when conductor 49 is positive with respect to conductor 42. When this condition exists, there will be an electron flow from one side of the secondary 31, conductor 42, resistor 82, jumper 81, jumper 80, cathode of the thyratron 34, to the control grid of the thyratron 34, resistor 94, condenser 97, conductor 49 to the other side of the secondary 31. As the condenser 97 discharges through the rheostat 96 and the resistor 95, the voltage developed across the rheostat 96 and the resistor 95 will bias the thyratron 34 to a point of non-conduction.

Turning next to a detailed description of the third stage, that of thyratron 35, the cathode thereof is connected to one side of the filament thereof by means of a jumper 100. The shield grid of the thyratron 35 is connected to conductor 42 through a resistor 101 and to the cathode through conductor 111. A relay 102 is connected across resistor 101. Relay 102 includes normally open contacts 103. A power source 104 and a bell or buzzer 105 are connected in series with the contacts 103. The relay 102 and the bell 105 may be placed either at the machine operator's position or at the remote or supervisory position. The control grid of the thyratron 35 is biased to a normally non-conducting point by an arrangement similar to that described for thyratron 34. The control grid of the thyratron 35 is connected to the cathode thereof by a condenser 106. The control grid of the thyratron 35 also is connected to conductor 49 through a resistor 107 and the parallel network including a condenser 108, and a rheostat 109 and a resistor 110 connected in series. The condenser 108 is charged in a similar manner to that by which condenser 97 is charged. When the control grid of the thyratron 35 is positive with respect to the cathode thereof, electrons will flow over the following path: from one side of the secondary 31, conductor 42, resistance 101, conductor 111, cathode of the thyratron 35, control grid of the thyratron 35, resistance 107, condenser 108, conductor 49, to the other side of the secondary 31.

Turning next to a detailed description of the operation of the present invention, reference is again made to the drawings. Assuming for purposes of this explanation that the motor 20 is connected to a machine tool, and that the machine tool is controlled by an operator, the switch 10 is then operated to cause power to be extended through conductors 11, 12, and 19 to the magnetic starter 13. Since contacts 23 are closed, the magnetic starter will operate to connect conductors 11, 12, and 19 to the electric motor 20, thereby causing and maintaining the operation of the electric motor 20. As previously described, the primary of the transformer 26 will reflect the input current drawn by the electric motor 20 into the secondary thereof. Since the primary of the transformer 27 is connected between conductors 14 and 11, the transformer 27 will be energized, and an alternating current plate voltage will be applied to the plates of each of the thyratrons 33, 34, and 35, the condenser 63 will be charged through the previously described network to bias the thyratron 33 to a point of non-conduction, and the condensers 97 and 108 will be charged to bias the thyratrons 34 and 35 respectively to points of non-conduction. Potentiometer 66 is adjusted so that the thyratron 33 is properly biased to a point of non-conduction. Potentiometer 73 is adjusted so that the current passing therethrough will develop a positive potential on the control grid of the thyratron 33 sufficient to cause thyratron 33 to fire only when the input current reflected into the secondary of the transformer 26 reaches a point equivalent to the approach of an overloading of the motor 20. Potentiometer 72 is adjusted to a point at which the closing of contacts 75 will not reduce the positive potential on the control grid of the thyratron 33 to a point to cause thyratron 33 to stop conducting unless the input current reflected into the secondary of transformer 26 reaches a point which is equivalent to an overloading of the motor 20. Rheostat 96 is set to a point wherein a two to three second delay will occur before the negative bias on the control grid of the thyratron 34 will be reduced to a point at which conduction of the thyratron 34 will occur. This is done to prevent a false operation of the instant invention by the excessive current drawn upon the starting of the motor 20. Rheostat 109 is set to a point at which a number of seconds delay will occur before the negative bias on the control grid of the thyratron 35 will be reduced to a point at which conduction may occur. This is done in order to allow the operator of machine tool a sufficient period of time in which to disengage the tool from the work-piece. Assuming now that the machine tool connected to the motor 20 is operated to cause the motor 20 to approach a point of overload, the increased current through the resistor 18 will cause an increased voltage drop thereacross. The increased voltage drop across the resistor 18 is applied to the primary of the transformer 26 and will be reflected into the secondary of the transformer 26 to cause a larger voltage drop across the resistors 71 and 73. Due to the previously described adjustment of the potentiometer 73, the control grid of the thyratron 33 will be driven positively an amount sufficient to cause the thyratron 33 to fire. As the thyratron 33 fires, current will be conducted through the previously described plate circuit to the cathode on every half cycle wherein the plate of the thyratron 33 is positive with respect to the cathode thereof. This will cause an operation of relay 53. Relay 53 will operate to close its contacts 52 and 75. The closing of contacts 75 will result in the shunting of the potentiometer 72 about the potentiometer 73, and as previously described, this will reduce the positive voltage on the control grid on the thyratron 33 to a point at which thyratron 33 will be cut off. Since thyratron 33 is no longer conducting, relay 53 will restore opening its contacts 75 and 52. When contacts 75 are open, the control grid of the thyratron 33 is again biased positively sufficiently to cause thyratron to again fire, and the previously described operation will again take place. This cycling action will continue until either the current drawn by the motor 20 reaches a point wherein the motor 20 is overloaded, or until the operation of the machine tool is so varied as to reduce the current drawn by the motor 20 to a point below that which is considered as approaching an overload thereof. The closing and opening of contacts 52 makes and breaks a previously described circuit for connecting the cathode of the thyratron 34 to conductor 49 and further, makes and breaks the following circuit for the flashing illumination of lamp 83: from one side of the secondary 31, conductor 49, conductor 54, contacts 52, conductor 51, jumper 80, conductor 81, lamp 83, conductor 42, to the other side of the secondary 31. Lamp 83, which is a red lamp, will continue to flash as long as the overload point of the motor 20 is approached. The thyratron 34 will not conduct since the time-delay characteristics of the biasing circuit thereof is longer than the time between the opening and closing of contacts 52. Since the relay 84 is in parallel to the lamp 83, the relay 84 will also energize and de-energize with the closing and opening of contacts 52 to close and open its contacts 85, and this will cause a flashing of lamp 87 at the remote or supervisory position through the previously described circuit therefor.

Assuming next that the overload point of the motor 20 is reached, the closing of contacts 75 will then be insufficient to reduce the positive voltage on the control grid of the thyratron 33 to a degree wherein the thyratron 33 will become non-conducting, and therefore, the thyratron 33 will no longer cycle between a conducting state and a non-conducting state, but will remain conducting. After the time delay determined by the adjustment of rheostat 96, thyratron 34 will begin to conduct over the previously described circuit. The lamps 83 and 87 will no longer flash, but will be steadily illuminated. As thyratron 34 conducts, condenser 46 will be charged and the voltage developed thereacross will cause an operation of relay 57. Relay 57 will operate to close contacts 56 and 92. The closing of contacts 92 will complete the following holding circuit from the cathode of the thyratron 34 to conductor 49: from the cathode of thyratron 34, jumper 80, conductor 81, push-button switch 88, conductor 89, push-button switch 90, conductor 91, contacts 92, conductor 49. The closing of contacts 92 will also complete a similar obvious holding circuit for a lamp 83 and relay 84. The closing of contacts 56 will complete the following circuit for the energization of relay 102: from one side of the secondary 31, conductor 49, conductor 58, contact 56, conductor 55, conductor 111, relay 102, conductor 42, to the other side of the secondary 31. Relay 102 will operate to close its contacts 103 to complete a previously described circuit for the operation of the bell or buzzer 105 to further indicate, in addition to the steadily burning lamps 83 and 87, that the overload condition has been reached. The closing of contact 56 also completes a circuit from the cathode of thyratron 35 to conductor 49 to initiate the time-delay biasing circuit of thyratron 35. As previously described, this will give the operator of the machine tool sufficient time in which to disengage the tool from the work-piece. After the time delay, the negative bias on the control grid of the thyratron 35 will be reduced to a point at which the thyratron 35 will begin to conduct. As thyratron 35 begins to conduct, relay 24 will operate to open its contacts 23. The opening of contacts 23 will break the holding circuit of the magnetic starter 13 and the magnetic starter 13 will restore to disconnect conductors 11, 12, and 19 from the motor 20, thereby stopping the motor 20 and the machine tool connected thereto.

The previously described conditions will continue until the present invention is restored to normal. Should it be desired to start the motor 20 independent of the control equipment, the closing of switch 25 will again complete the holding circuit for the magnetic starter 13. If push button 88 or 99 is momentarily operated to break the afore-described circuits connected thereto, thyratron 34 will cease conducting and will return to the normally non-conducting state, causing relay 57 to restore. Assuming that the input current to the motor 20 has been reduced to a normal value, the thyratron 33 will no longer cycle. The restoration of relay 57 will again open the cathode circuit of the thyratron 35 and thyratron 35 will return to the normal non-conducting state. Relay 24 will also restore. The restoration of relays 57 and 24 will cause the extinguishment of lamp 83 and the de-energization of relays 84 and 102 to cause an extinguishment of lamp 87 and silencing of bell 105 respectively. The present invention is then ready for reoperation and as long as switch 10 is operated and lamp 112 is illuminated, the present invention will again operate as previously described when an overload condition is again approached or reached.

Having described the present invention what is considered new and desired to be protected by Letters Patent is:

1. In a motor control, a first thyratron tube stage including biasing circuit means, said biasing circuit means connected in shunt of the input of said motor and operating to bias said first thyratron tube stage to a point of non-conduction when said input current is of a normal amount, said biasing circuit means operating responsive to an increase in said input current to reflect an approach of an overloaded condition of said motor for causing said first thyratron tube stage to conduct intermittently, said biasing circuit means further operating responsive to an increase in said input current reflecting an overloaded condition of said motor for causing said first thyratron tube stage to conduct steadily, a lamp, circuit means associated with said lamp and said first thyratron tube stage for causing said lamp to flash on and off responsive to an intermittent conduction of said first thyratron tube stage, a second thyratron tube stage, said second thyratron tube stage operating responsive to a steady conduction of said first thyratron tube stage for conducting current therethrough, and second circuit means connected to said second thyratron tube stage and said lamp for causing said lamp to be illuminated steadily responsive to the conduction of current by said second thyratron tube stage.

2. In a motor control, a thyratron tube stage including biasing circuit means, said biasing circuit means connected in shunt of the input of said motor and operating to bias said thyratron tube stage to a point of non-conduction when said input current is of a normal amount, said biasing circuit means operating responsive to an increase in said input current to reflect an approach of an overloaded condition of said motor for causing said thyratron tube stage to conduct intermittently, said biasing circuit means further operating responsive to an increase in said input current reflecting an overloaded condition of said motor for causing said thyratron tube stage to conduct steadily, a lamp, circuit means associated with said lamp and said thyratron tube stage for causing said lamp to flash on and off responsive to an intermittent conduction of said thyratron tube stage and to be steadily illuminated responsive to a steady conduction of said thyratron tube stage.

3. In a motor control, a thyratron tube stage, a control grid biasing network for said thyratron tube stage, said control grid biasing network connectible in shunt of the input to said motor, said control grid biasing network formed to be adjustable to permit said thyratron tube stage to conduct current when said network is connected in shunt of the input of said motor and a certain value of the input current to said motor is reached, a relay connected in the plate circuit of said thyratron tube stage, said relay operating responsive to the conduction of current through said thyratron tube stage, circuit means connected to the contacts of said relay and operating responsive to the operation of said relay and the closing of said contacts thereof for increasing the negative bias on the control grid of said thyratron tube stage when said certain value of input current is connected in shunt of said control grid biasing network so that said thyratron tube stage is caused to cease conducting current therethrough, a lamp, second circuit means connected to said lamp and to other contacts of said relay whereby said lamp is illuminated when said other contacts of said relay are closed and extinguished when said other contacts of said relay are opened.

4. In combination, an electrical motor, means for applying an input voltage to said motor for operating said motor, a thyratron tube stage, a control grid biasing network for said thyratron tube stage, said control grid biasing network connected in shunt of the input voltage to said motor, said control grid biasing network formed to be adjustable to cause said thyratron tube stage to conduct current when a certain value of the input current to said motor is reached, a relay connected in the plate circuit of said thyratron tube stage, said relay operating responsive to the conduction of current through said thyratron tube stage and restoring responsive to the non-conduction of current therethrough, circuit means connected to the contacts of said relay and operating responsive to the operation of said relay and the closing of contacts thereof for increasing the negative bias on the control grid of said thyratron tube stage when said certain value of input current is reached, whereby said thyratron tube stage is caused to cease conducting current therethrough, a lamp, second circuit means connected to said lamp and to other contacts of said relay whereby said lamp is illuminated when said other contacts of said relay are closed and extinguished when said other contacts of said relay are opened.

5. In a motor control, a thyratron tube stage, said thyratron tube stage comprising a thyratron tube having a control grid, a shield grid, and a plate, said thyratron tube stage further comprising an alternating current plate voltage source, control biasing network connectible in shunt of the input to said motor, and a shield grid biasing network, said shield grid biasing network formed to normally bias said thyratron tube to a point of non-conduction of current therethrough, said control grid biasing network formed to be adjustable to permit said thyratron tube to conduct current when said network is connected in shunt of the input of said motor and a certain value of the input current to said motor is reached, a relay connected in the plate circuit of said thyratron tube, said relay operating responsive to the conduction of current through said thyratron tube and restoring responsive to the non-conduction of current through said thyratron tube, circuit means connected to the contacts of said relay and operating responsive to the operation of said relay and the closing of said contacts thereof for increasing the negative bias on the control grid of said thyratron tube when said certain value of input current is connected in shunt of said control grid biasing network so that said thyratron tube is caused to cease conducting current therethrough, a lamp, second circuit means connected to said lamp and to other contacts of said relay whereby said lamp is illuminated when said other contacts of said relay are closed and extinguished when said other contacts of said relay are opened.

6. In a motor control, a thyratron tube stage including biasing circuit means, said biasing circuit means connected in shunt of the input of said motor and operating to bias said thyratron tube stage to a point of non-conduction when said input current is of a normal amount, said biasing circuit means operating responsive to an increase in said input current to reflect an approach of an overloaded condition of said motor for causing said thyratron tube stage to conduct intermittently, said biasing circuit means further operating responsive to an increase in said input current reflecting an overloaded condition of said motor for causing said thyratron tube stage to conduct steadily, signal means, circuit means associated with said signal means and said thyratron tube stage for causing said signal means to operate responsive to an intermittent conduction of said thyratron tube stage to indicate an approach of an overloaded condition of said motor and for causing said signal means to operate responsive to a steady conduction of said thyratron tube stage to indicate an overloaded condition of said motor.

References Cited in the file of this patent

UNITED STATES PATENTS

| | | |
|---|---|---|
| 1,997,463 | Kelly | Apr. 9, 1935 |
| 2,073,359 | Witts | Mar. 9, 1937 |
| 2,091,086 | Taylor | Aug. 24, 1937 |
| 2,175,889 | Forbes | Oct. 10, 1939 |
| 2,305,845 | Cockerell | Dec. 22, 1942 |
| 2,527,779 | Weiland | Oct. 31, 1950 |
| 2,509,497 | Nesson | May 30, 1950 |
| 2,590,973 | Jordan | Apr. 1, 1952 |
| 2,688,720 | Stack | Sept. 7, 1954 |